(12) United States Patent (10) Patent No.: US 7,215,336 B2
Fujiwara et al. (45) Date of Patent: May 8, 2007

(54) METHOD FOR GENERATING SURFACE DATA TO BE ADDED TO THREE DIMENSIONAL SHAPE DATA

(75) Inventors: Koichi Fujiwara, Otsu (JP); Osamu Toyama, Kakogawa (JP); Eiro Fujii, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 528 days.

(21) Appl. No.: 10/847,886

(22) Filed: May 19, 2004

(65) Prior Publication Data

US 2004/0212613 A1 Oct. 28, 2004

Related U.S. Application Data

(63) Continuation of application No. 09/748,142, filed on Dec. 27, 2000, now abandoned.

(30) Foreign Application Priority Data

Dec. 27, 1999 (JP) ............................. 11-369025

(51) Int. Cl.
*G06T 17/00* (2006.01)
(52) U.S. Cl. ..................... 345/419; 345/582
(58) Field of Classification Search ................ 345/419, 345/582
See application file for complete search history.

(56) References Cited

U.S. PATENT DOCUMENTS 5,731,816 A 3/1998 Stewart et al.
6,106,466 A 8/2000 Sheehan et al.
6,256,038 B1 7/2001 Krishnamurthy

FOREIGN PATENT DOCUMENTS

JP 9-44701 2/1997

OTHER PUBLICATIONS

Yajima et al ("A Grid Generation System for Process and Device Simulation": 1988 IEEE).

*Primary Examiner*—Almis R. Jankus
(74) *Attorney, Agent, or Firm*—McDermott Will & Emery LLP

(57) ABSTRACT

An object of the present invention is to automatically determine the orientation of a newly generated surface, etc. when performing such processing as filling a dropout portion of three dimensional shape data, and to generate more natural three dimensional shape data. The present invention provides a method for generating a grid-patterned surface in three dimensional shape data, and comprises a first step (#11) for detecting the orientation of a polygon in the three dimensional shape data that is located at a periphery of a surface to be fitted, a second step (#12) for determining the orientation of the surface so that a grid orientation of the surface matches the orientation of the detected polygon, and a third step (#13) for fitting the surface onto the three dimensional shape data while maintaining the thus determined orientation.

16 Claims, 17 Drawing Sheets

METHOD FOR GENERATING SURFACE DATA TO BE ADDED TO THREE DIMENSIONAL SHAPE DATA

This application is a continuation of application Ser. No. 09/748,142 filed Dec. 27, 2000 now abandoned.

RELATED APPLICATION

This application is based on application No. H11-369025 filed in Japan, the entire content of which is hereby incorporated by reference.

BACKGROUND OF THE INVENTION

1. Field of the Invention

The present invention relates to a method for generating surface data to be added to three dimensional shape data.

2. Description of the Related Art

It is known in the art to generate three dimensional shape data by using a three dimensional measuring apparatus utilizing the light section method or the like. The three dimensional measuring apparatus optically scans an object to be measured, by projecting, for example, a slit ray and deflecting it, and obtains three dimensional shape data by calculation based on the principle of triangulation. By measuring around the circumference of the object and joining together the acquired three dimensional shape data, the three dimensional shape data of the entire object is obtained.

However, depending on the shape and orientation of the object or the illumination condition, three dimensional shape data may not be obtained fully, and may contain data dropouts.

In that case, such data dropout portions must be filled. One way to achieve this is to generate a grid-patterned surface and join the generated surface and the data dropout portion together along the contour thereof.

The problem here is what surface is to be generated and how the generated surface is arranged with respect to the original three dimensional shape data. In this case, if the user has to determine or make such settings to generate three dimensional data, the user would have to go through extremely time and labor consuming procedures.

SUMMARY OF THE INVENTION

An object of the present invention is to solve the above problem. Another object of the invention is to accomplish proper surface fitting to three dimensional shape data. Still another object of the invention is to generate natural three dimensional shape data when surface fitting is applied to the three dimensional data. Yet another object of the invention is to automatically determine the orientation or grid density of a newly generated surface.

These and other objects are attained by a method for generating a grid-patterned surface in three dimensional shape data, the method comprising a first step for detecting the orientation of a polygon in the three dimensional shape data that is located at a periphery of a surface to be fitted, a second step for determining the orientation of the surface so that a grid orientation of the surface matches the orientation of the detected polygon, and a third step for fitting the surface onto the three dimensional shape data while maintaining the thus determined orientation.

The above objects of the invention are also attained by detecting in the first step a vector whose starting point is at a vertex of the polygon located at the periphery of the surface to be fitted, and whose end point is at a vertex connected to the vertex taken as the starting point, and by determining the orientation of the surface in the second step so that the grid orientation of the surface aligns with a coordinate space whose X or Y axis is taken along a direction in which the vector is pointed.

In another preferred mode, the above objects of the invention are attained by a method comprising a first step for detecting in three dimensional shape data a surface shape around a periphery of a surface to be fitted, a second step for determining the orientation of the surface so that the grid orientation of the surface matches the detected shape, and a third step for fitting the surface onto the three dimensional shape data while maintaining the thus determined orientation.

The above objects of the invention are also attained by generating in the first step a rectangular bounding box that fits around the periphery of the surface to be fitted, setting a grid inside and outside the bounding box, and obtaining a Z value of a vertex of the grid as a boundary value, and by rotating the bounding box in the second step so that an evaluation value based on the boundary value is minimized or maximized, and determining the orientation of the surface so that the grid orientation of the surface aligns with a coordinate space whose X or Y axis is taken along a direction in which the grid of the bounding box is oriented.

In still another preferred mode, the above objects of the invention are attained by a method comprising a first step for detecting the density of polygons in the three dimensional shape data that are located around a periphery of a surface to be fitted, a second step for determining a grid density of the surface so that the grid density of the surface matches the detected density, and a third step for generating a surface with the thus determined density and fitting the generated surface onto the three dimensional shape data.

The above objects of the invention are also attained by taking, in the first step, the periphery of the surface to be fitted as forming a polygon, detecting vectors each consisting of two adjacent vertices in the vertices forming the polygon, and detecting the density in X direction on the basis of an average value of the x components of the vectors near the X-axis direction and the density in Y direction on the basis of an average value of the y components of the vectors near the Y-axis direction.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numerals throughout the several drawings.

DESCRIPTION OF THE PREFERRED EMBODIMENTS

The preferred modes of the present invention will become apparent from the following description given with reference to the accompanying drawings.

Figure 1:
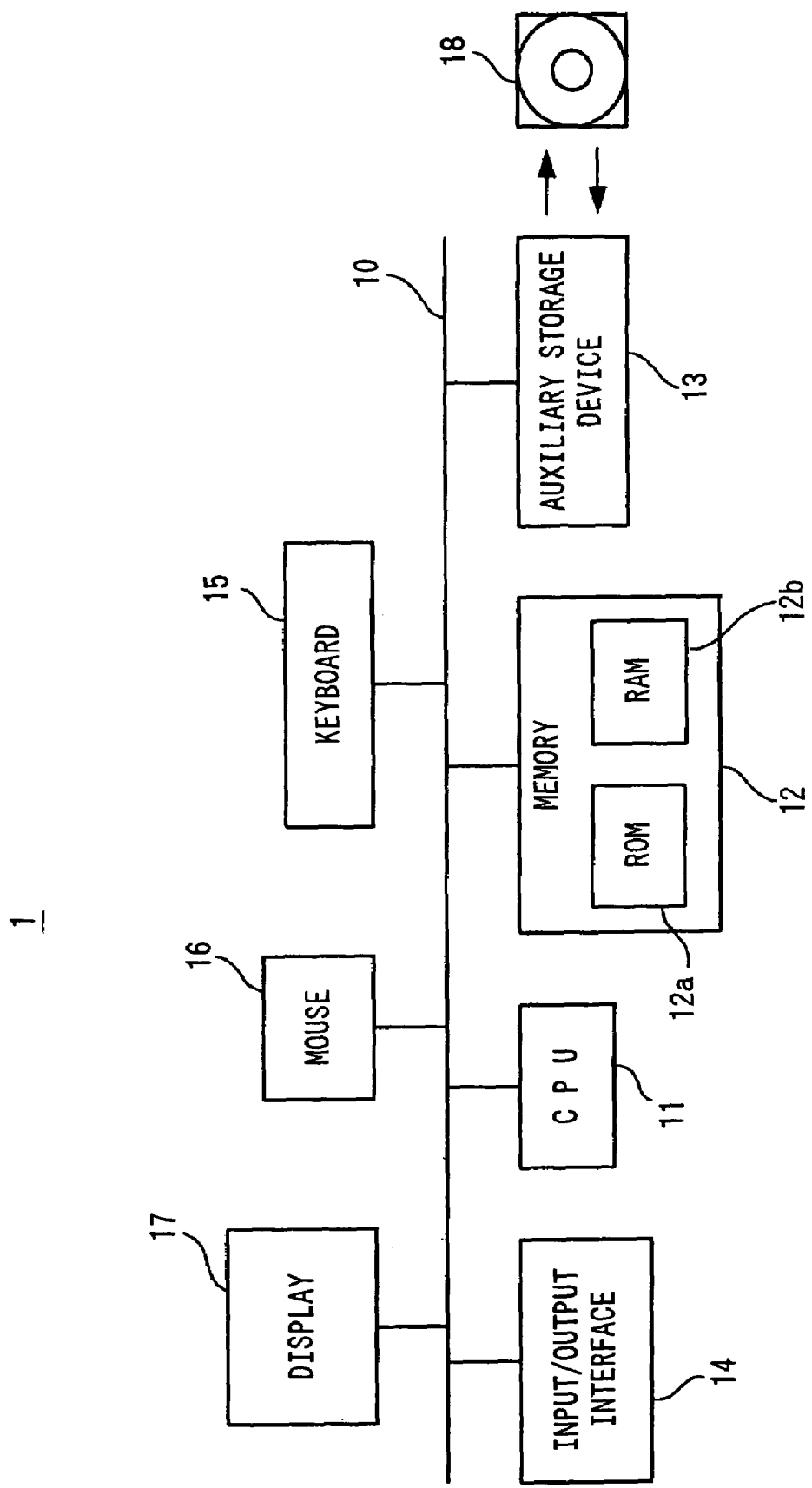
FIG. 1 is a block diagram showing schematically the configuration of a three dimensional processing apparatus embodying the present invention.

FIG. 1 is a block diagram showing schematically the configuration of a three dimensional processing apparatus 1 embodying the present invention.

In FIG. 1, the three dimensional processing apparatus 1 comprises a CPU (processor) 11, a memory 12, an auxiliary storage device 13, an input/output interface 14, a keyboard 15, a mouse 16, and a display 17, each connected to a bus 10.

The CPU 11 carries out various kinds of processing including processing for the surface generation method of the present invention. The memory 12 includes a ROM 12a which stores a control program describing procedures that the CPU 11 carries out, a RAM 12b which provides a data storage area and work area necessary for the CPU 11 to carry out the various kinds of processing, and a driver 18 for reading out data stored on a portable storage medium such as a CD-ROM. The auxiliary storage device 13 is used to store data to be processed, such as three dimensional data (three dimensional shape data) and two dimensional color image data. The input/output interface 14 is used to input data to be processed from an external device or to output generated data to an external device.

The keyboard 15 and mouse 16 are used to input various kinds of data, instructions, or settings. The display 17 is used to display three dimensional data and generated surface images, and also display processing state, processing results, and the progression of processing. The display 17 is capable of displaying a plurality of windows using a multi-window system.

Using the three dimensional processing apparatus 1, processing such as data filling, generation of a new surface, etc. can be applied to data dropout portions of the input three dimensional data. More specifically, the CPU 11 performs the processing by loading a program for carrying out such processing from the ROM 12a. A portable storage medium holding thereon a program for carrying out such processing may be inserted into the driver 18; in this case also, the CPU can perform the processing by loading the program stored on the portable storage medium.

Further, by using the driver 18, a processing program stored on a portable storage medium can be installed on the three dimensional processing apparatus 1.

Three modes of operation for surface generation and shape, i.e., the first to third modes of the invention, will be described below.

[Mode 1]

Figure 2:
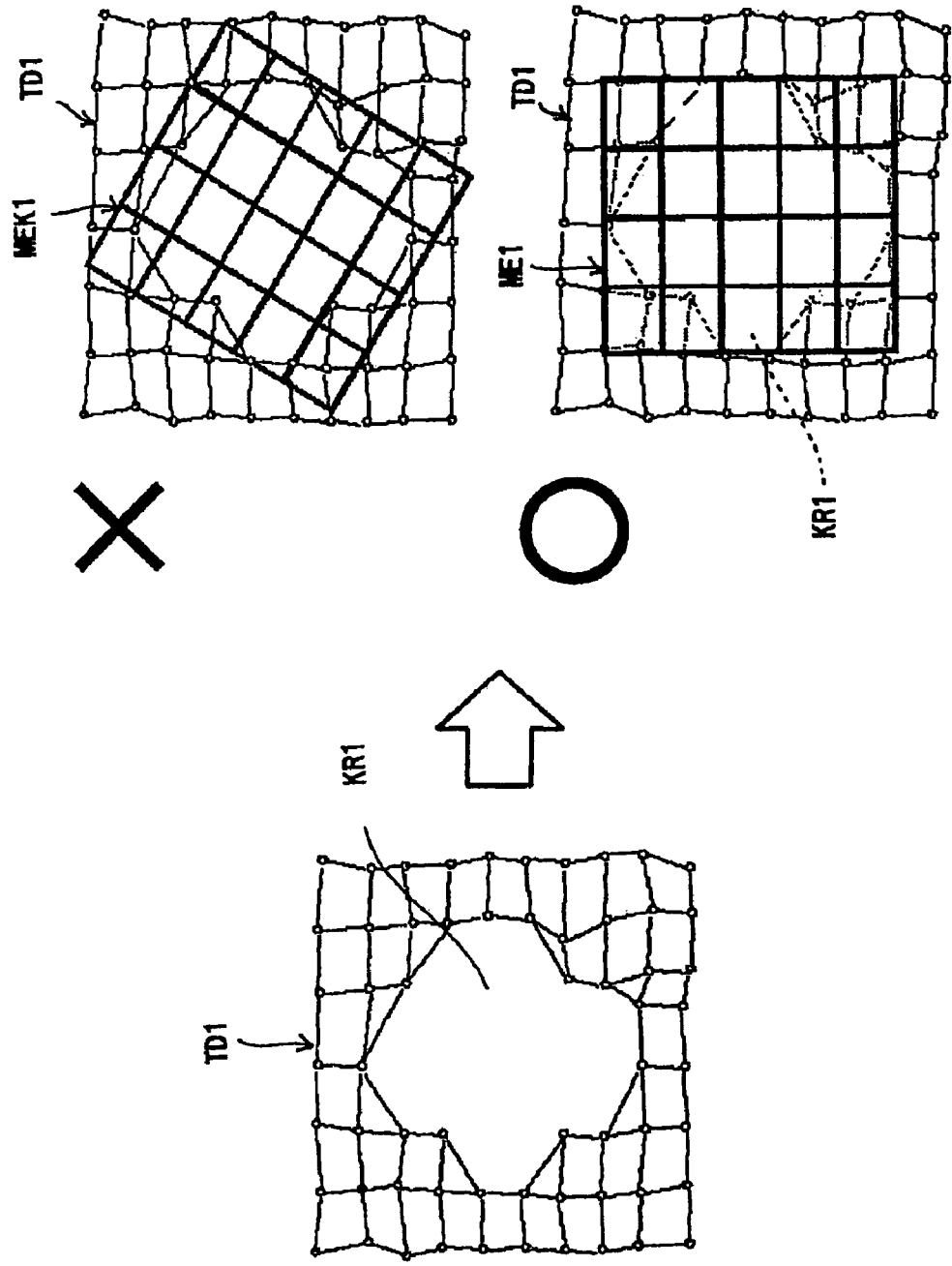
FIG. 2 is a diagram for explaining a first mode for generating a surface for three dimensional data.
Figure 3:
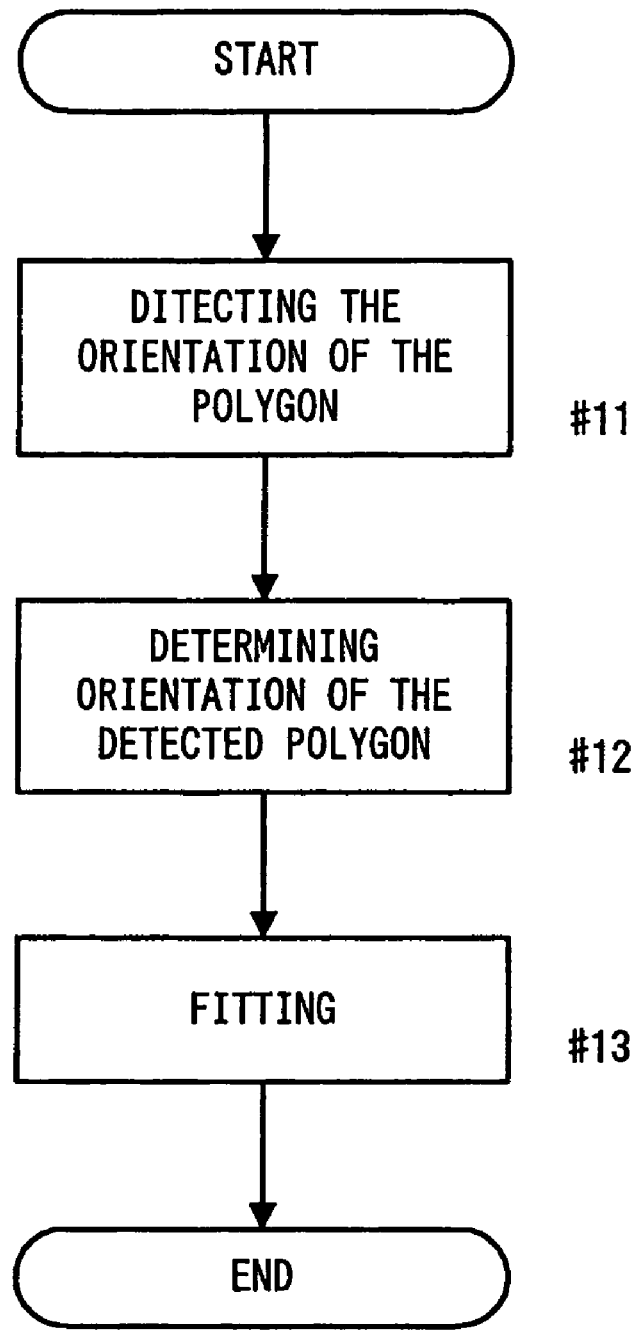
FIG. 3 is a flow chart illustrating a surface generation process according to the first mode.

FIG. 2 is a diagram for explaining the first mode for generating a surface for three dimensional data TD1, and FIG. 3 is a flow chart illustrating a surface generation process according to the first mode.

A portion of the three dimensional data TD1 is shown in FIG. 2. The three dimensional data TD1 includes a data dropout portion KR1. A new surface ME1 is generated and fitted onto the dropout portion KR1.

When generating or fitting the surface ME1, the orientation of the surface ME1 is determined so as to match the orientation of the polygons in the three dimensional data TD1, as shown at the lower right of FIG. 2. In the case of the surface MEK1 shown at the upper right of FIG. 2, its grid orientation does not match the orientation of the polygons in the three dimensional data TD1.

In FIG. 3, the orientation of the polygons located around the periphery of the surface to be fitted, that is, the dropout portion KR1 of the three dimensional data TD1, is detected (#11). Next, the orientation of the surface ME1 is determined so that the grid orientation of the surface ME1 matches the orientation of the detected polygons (#12). The surface ME1 with the thus determined orientation is fitted onto the three dimensional data TD1 (#13). Three dimensional data TD1 free from dropout portions is thus generated.

Since this processing is performed automatically, the user is freed from troublesome procedures, and more natural three dimensional data TD1 can be generated.

The surface ME1 can also be fitted onto a portion for which it is desired to generate a new surface, instead of fitting it onto the dropout portion KR1.

[Mode 2]

Figure 4:
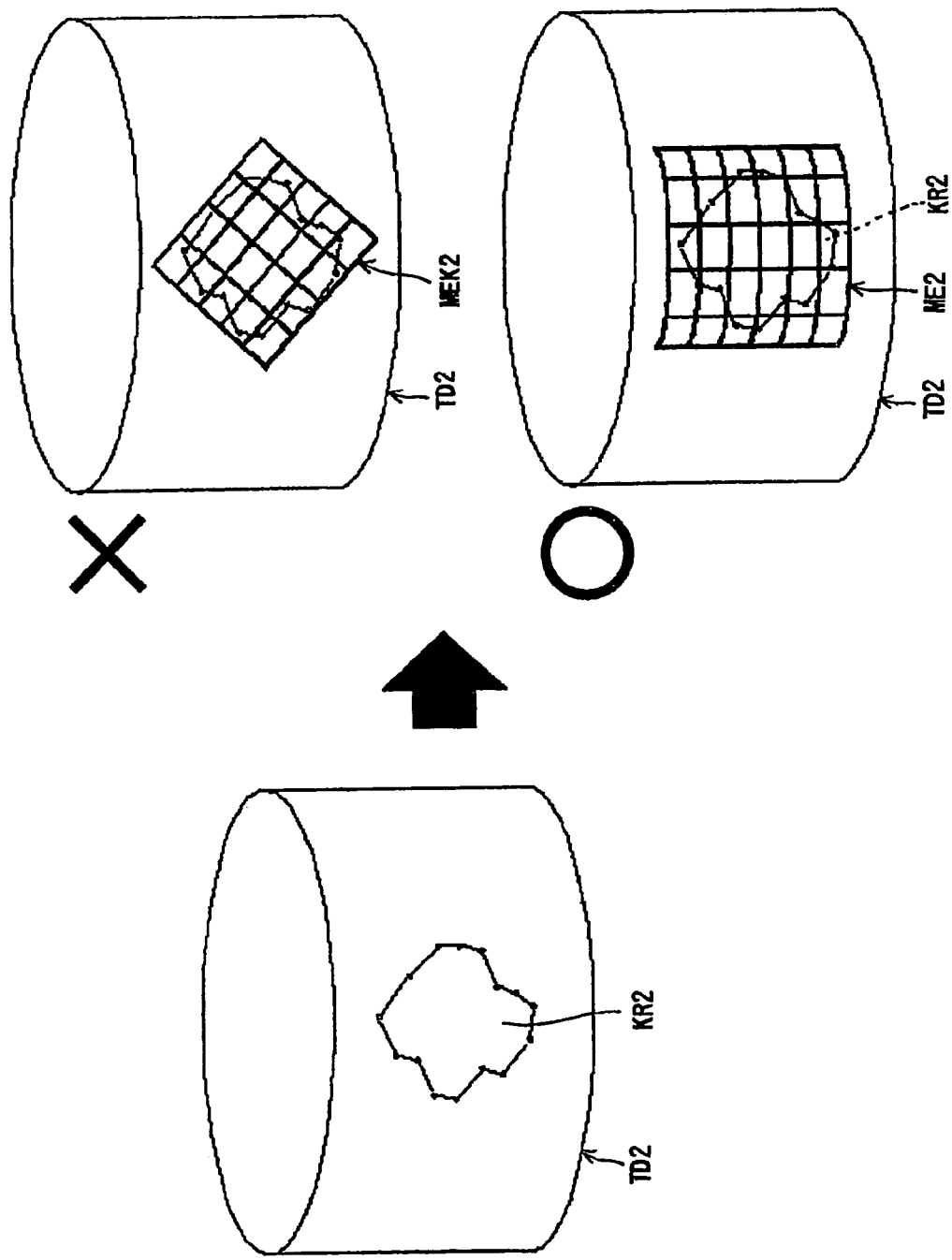
FIG. 4 is a diagram for explaining a second mode for generating a surface for three dimensional data.
Figure 5:
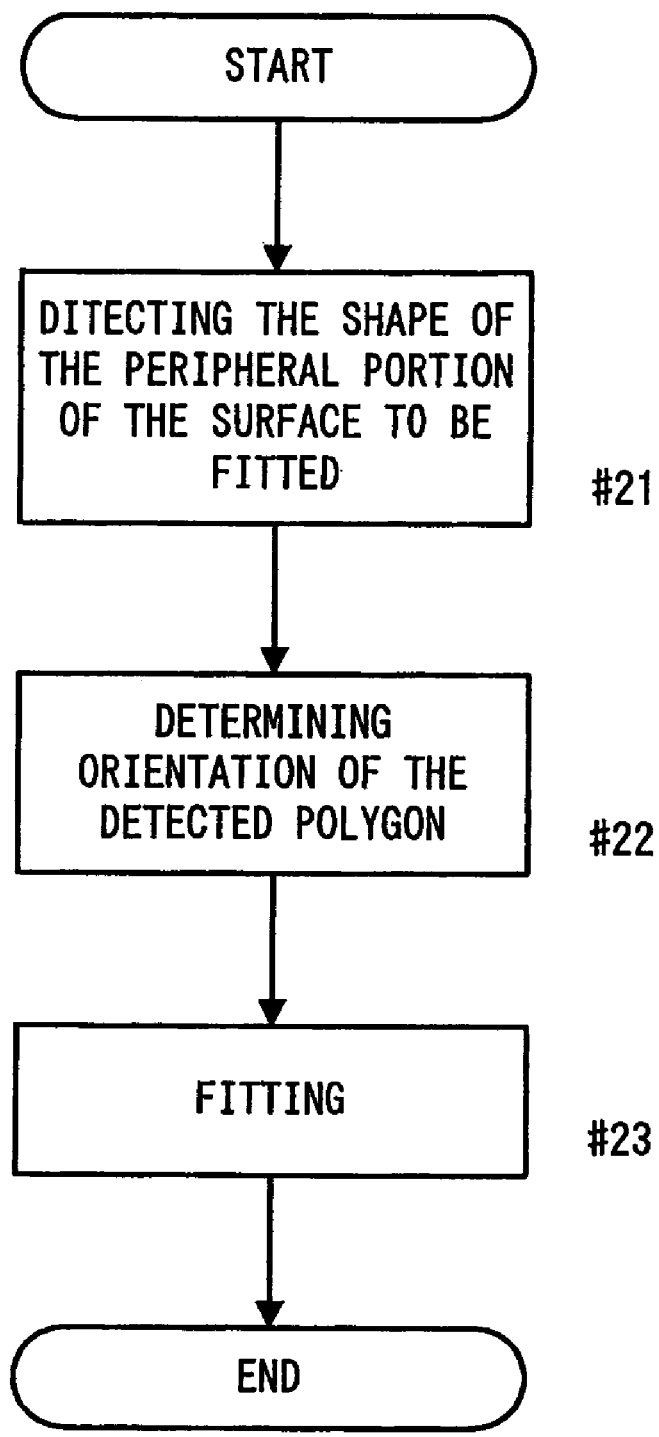
FIG. 5 is a flow chart illustrating a surface generation process according to the second mode.

FIG. 4 is a diagram for explaining the second mode for generating a surface for three dimensional data TD2, and FIG. 5 is a flow chart illustrating a surface generation process according to the second mode. The second mode corresponds to the invention described in claim 3.

The three dimensional data TD2 shown in FIG. 4 represents a cylindrically shaped object. The three dimensional data TD2 includes a data dropout portion KR2 in a portion of its circumferential surface. A new surface ME2 is generated and fitted onto the dropout portion KR2.

When generating or fitting the surface ME2, the orientation of the surface ME2 is determined so as to match the shape of the three dimensional data TD2, as shown at the lower right of FIG. 4. In the case of the surface MEK2 shown at the upper right of FIG. 4, its grid orientation does not match the shape of the three dimensional data TD2.

In FIG. 5, the shape of the peripheral portion of the surface to be fitted, that is, the dropout portion KR2 of the three dimensional data TD2, is detected (#21). Next, the orientation of the surface ME2 is determined so that the grid orientation of the surface ME2 matches the detected shape (#22). The surface ME2 with the thus determined orientation is fitted onto the three dimensional data TD2 (#23). Three dimensional data TD2 free from dropout portions is thus generated.

Since this processing is performed automatically, the user is freed from troublesome procedures, and more natural three dimensional data TD2 can be generated.

The surface ME2 can also be fitted onto a portion for which it is desired to generate a new surface, instead of fitting it onto the dropout portion KR2. The surface ME2 can be deformed in such a manner as to follow the shape of the three dimensional data TD2.

[Mode 3]

Figure 6:
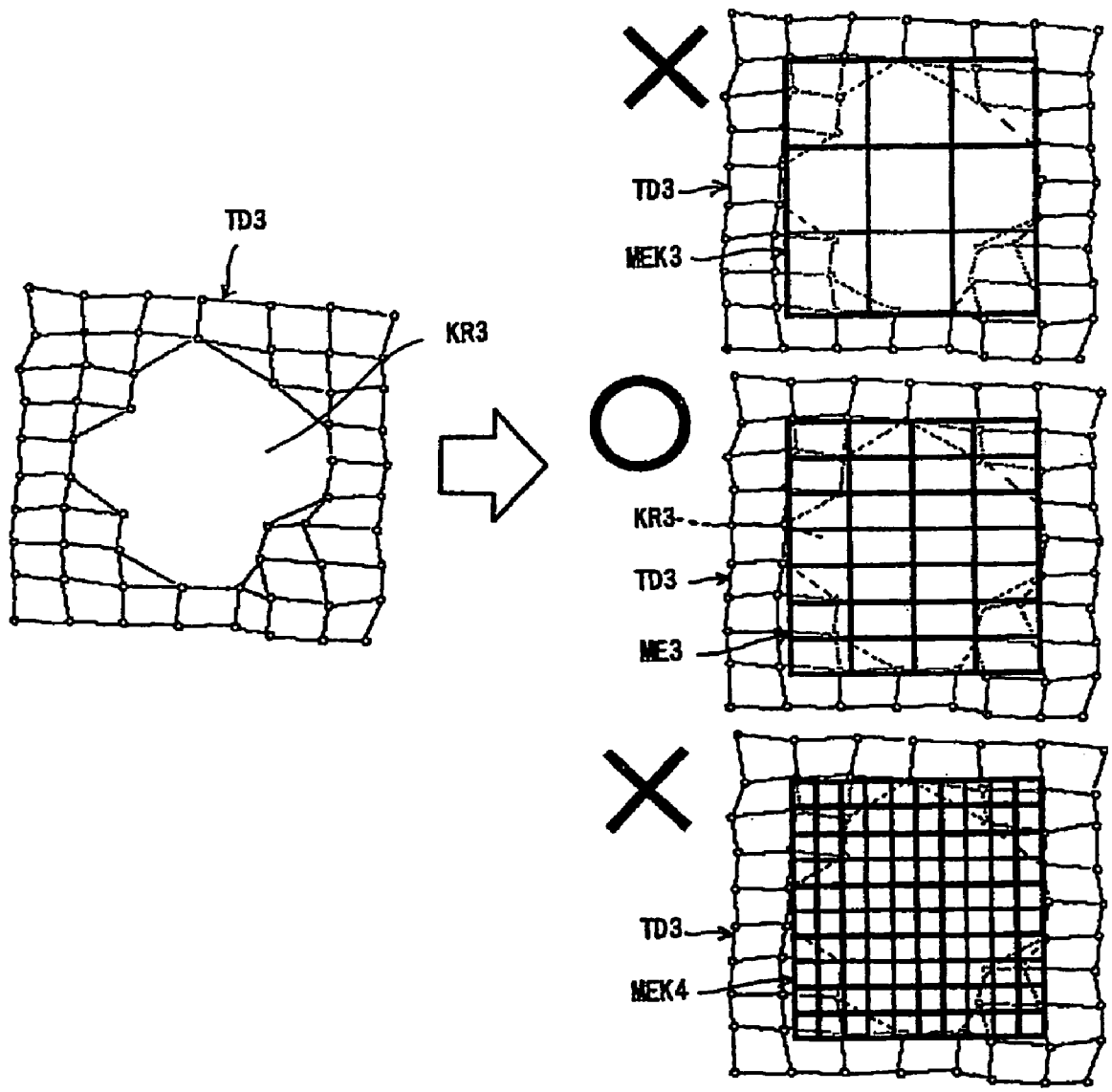
FIG. 6 is a diagram for explaining a third mode for generating a surface for three dimensional data.
Figure 7:
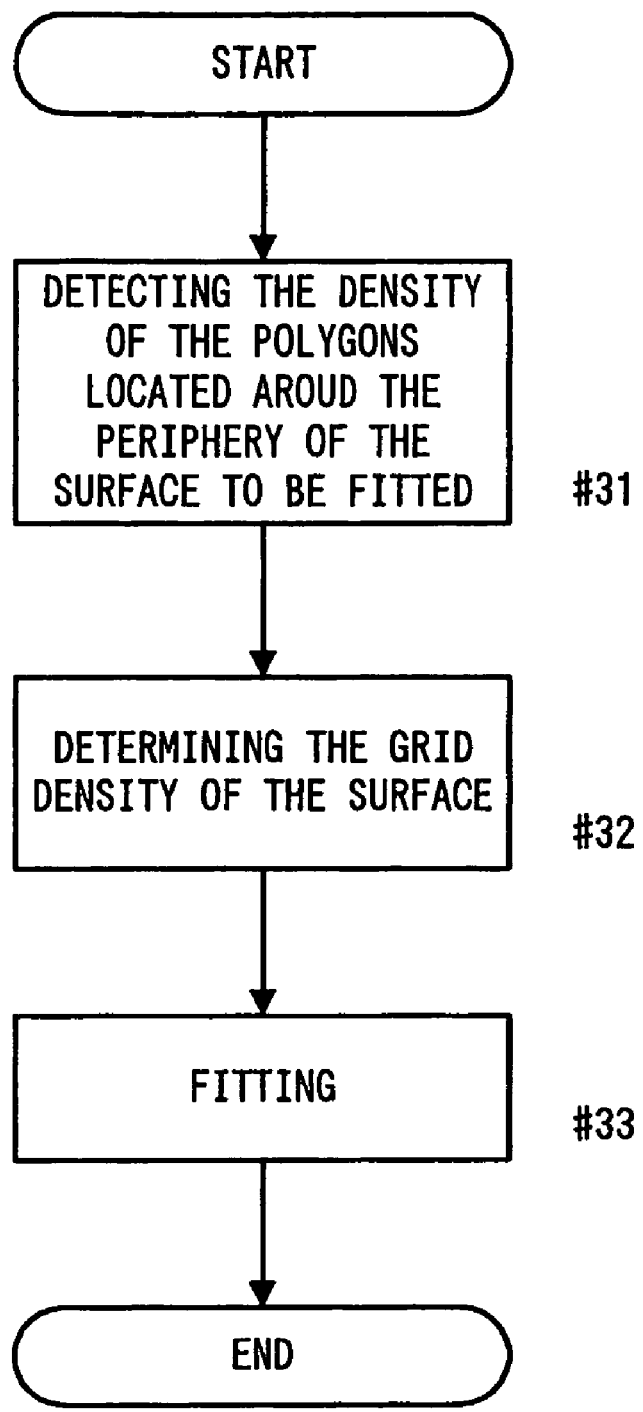
FIG. 7 is a flow chart illustrating a surface generation process according to the third mode.

FIG. 6 is a diagram for explaining the third mode for generating a surface for three dimensional data TD3, and FIG. 7 is a flow chart illustrating a surface generation process according to the third mode. The third mode corresponds to the invention described in claim 5.

A portion of the three dimensional data TD3 is shown in FIG. 6. The three dimensional data TD3 includes a data dropout portion KR3. A new surface ME3 is generated and fitted onto the dropout portion KR3.

When generating or fitting the surface ME3, the grid density of the surface ME3 is determined so as to match the grid density of the polygons in the three dimensional data TD3, as shown at the center in the right side of FIG. 6. In the case of the surfaces MEK3 and MEK4 shown at the upper right and lower right of FIG. 6, the grid density is too low or too high and does not match the density of the polygons in the three dimensional data TD3.

In FIG. 7, the density of the polygons located around the periphery of the surface to be fitted, that is, the dropout portion KR3 of the three dimensional data TD3, is detected (#31). Next, the grid density of the surface ME3 is determined so that the grid density of the surface matches the detected density (#32). The surface ME3 with the thus determined grid density is fitted with its orientation matched to the orientation of the polygons in the three dimensional data TD3 (#33). Three dimensional data TD3 free from dropout portions is thus generated.

Since this processing is performed automatically, the user is freed from troublesome procedures, and more natural three dimensional data TD3 can be generated.

The surface ME3 can be fitted onto a portion for which it is desired to generate a new surface, instead of fitting it onto the dropout portion KR3.

The above three modes will be described in further detail below.

[Details of Mode 1]

As described above, in the first mode, a surface is generated for the data dropout portion KR so that the orientation of the surface matches the orientation of the polygons in the three dimensional data TD. When fitting the grid-patterned plane surface onto the dropout portion KR of the three dimensional data TD, the orientation of the plane surface, that is, the orientation of the XY coordinate axes of the plane, is set so as to match the orientation of the polygons located around the periphery of the dropout portion KR.

[Embodiment 1 of Mode 1]

Figure 8:
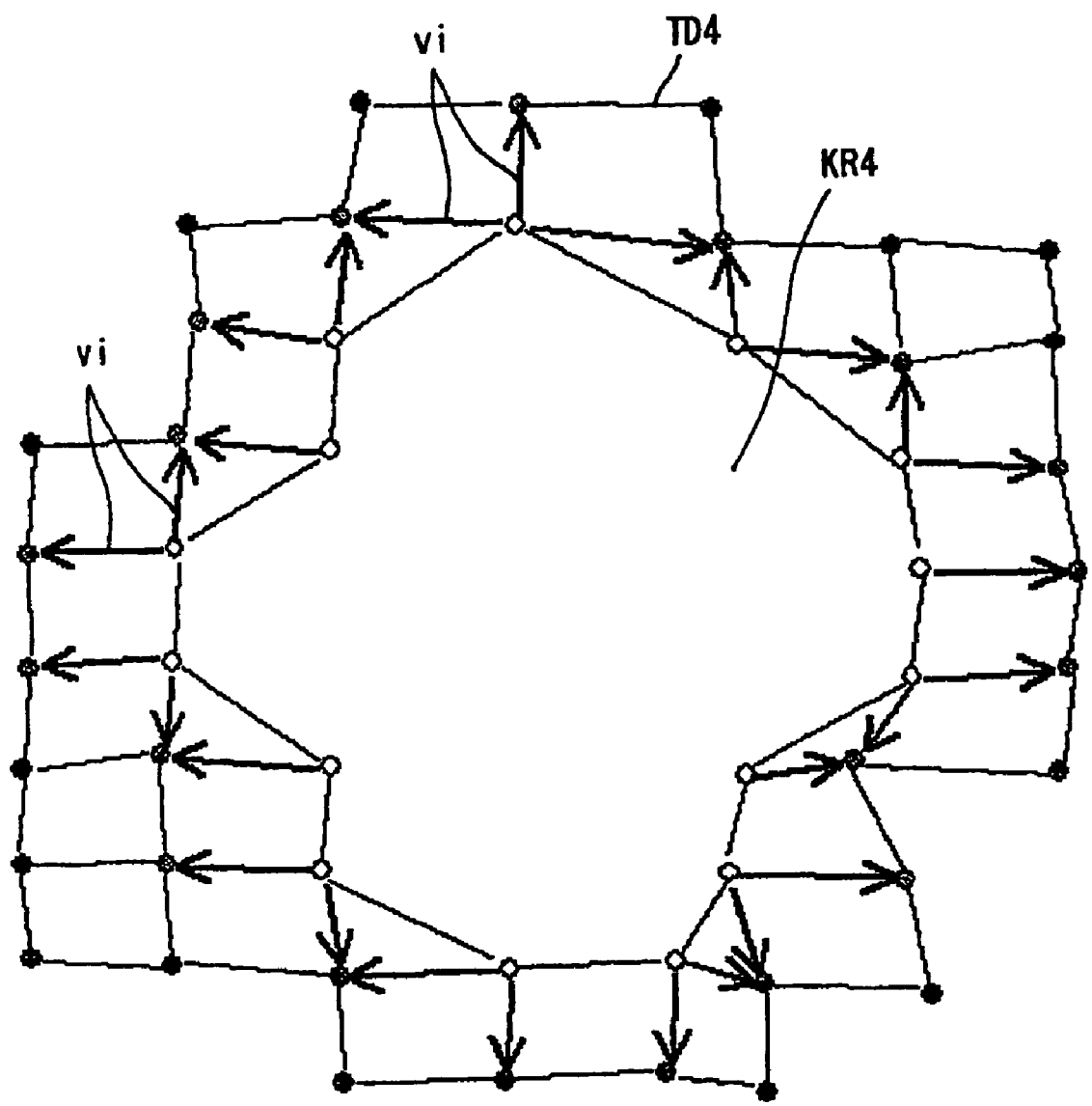
FIG. 8 is a diagram showing vectors around the periphery of a dropout portion in three dimensional data.
Figure 9:
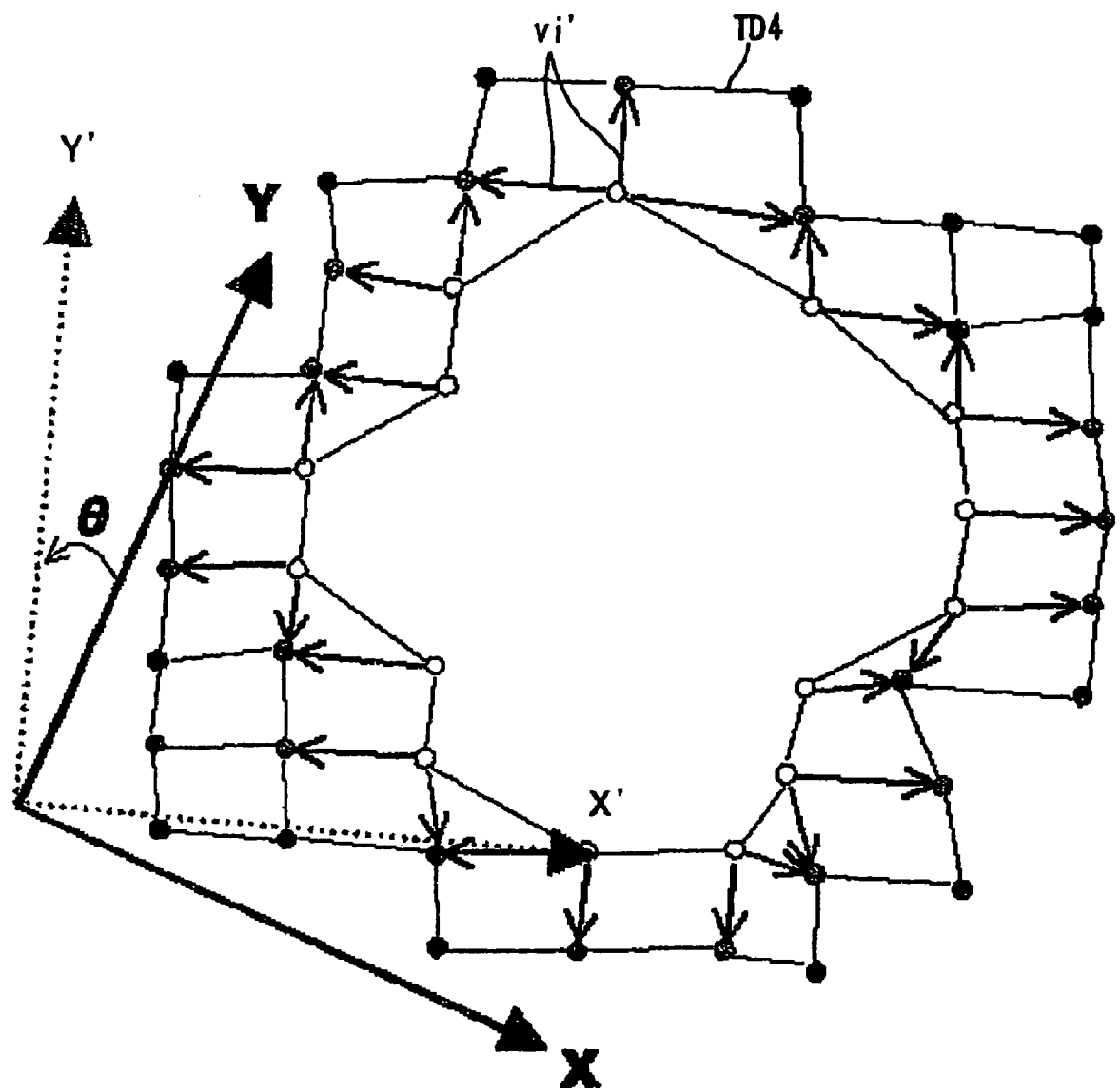
FIG. 9 is a diagram showing the relationship between X and Y axes and X' and Y axes.

FIG. 8 is a diagram showing vectors around the periphery of a dropout portion KR4 in three dimensional data TD4, and FIG. 9 is a diagram showing the relationship between X and Y axes and X' and Y' axes.

The following processing (a) to (d) is carried out for the dropout portion KR4 of the three dimensional data TD4.

(a) Regard the dropout portion KR4 of the three dimensional data TD4 as a polygon, and find a normal to it. Then, set the direction of the normal as the Z-axis direction of the plane surface (surface ME) to be generated. As a result, when the three dimensional data TD4 is viewed with its dropout portion KR4 facing the viewer, its depth direction is the Z-axis direction and the X and Y axes are set in a plane parallel to the dropout portion KR4.

Here, the X and Y axes are set in suitable directions (see FIG. 9). For example, the line of intersection between the plane surface to be fitted and the XY plane of the original coordinate system is set as the X axis. Then, the three dimensional data TD4 is converted to the newly set XYZ coordinate system. The following description considers the XY plane in this newly set coordinate system.

(b) Pick up vectors vi=(xi, yi), each having a starting point at one of the vertices forming the dropout portion KR4 and an end point at a vertex connected to the vertex taken as the starting point, as shown in FIG. 8. At this time, each vector vi is normalized to magnitude 1. Using the vectors vi, the X and Y axes of the plane surface to be generated are determined.

(c) Assume here that the X and Y axes are rotated through $\theta$ ($0 \leq \theta \leq \pi/2$) about the Z axis. The rotated axes are denoted by X' axis and Y' axis, respectively. In the coordinate system rotated through $\theta$, if the original vectors vi=(xi, yi) have become vectors vi'=(xi', yi') after rotation, the relationship between them is expressed by equation (1) below.

$$xi' = xi \cos\theta + yi \sin\theta$$
$$yi'' = -xi \sin\theta + yi \cos\theta \qquad (1)$$

(d) For the plane surface generated by the coordinate system rotated through $\theta$ from the coordinate system set in the above processing (a) to match the polygons located around the periphery of the dropout portion KR4, in the X'Y' coordinate system the vectors vi'=(xi', yi') should be made close to (1, 0), (0, 1), (-1, 0), and (0, -1). That is, the vectors vi' should be set parallel to the X' axis or Y' axis.

Therefore, the value of $\theta$ should be found that minimizes the sum of the squares of the products of the x and y components of the vectors vi. If this is expressed as evaluation function E, the following equation (2) is given.

$$E = \sum_i (x_i' y_i')^2 \qquad (2)$$

Substituting the equation (1) into the equation (2), the following equation (3) is obtained.

$$E = \sum_i [(x_i\cos\theta + y_i\sin\theta)(-x_i\sin\theta + y_i\cos\theta)]^2 \quad (3)$$

Setting $a=\cos\theta$ and $b=\sin\theta$, the equation (3) is transformed to obtain the following equation (4).

$$E = \sum_i [(x_i a + y_i b)(-x_i b + y_i a)]^2 \quad (4)$$
$$= \sum_i [x_i y_i a^2 - (x_i^2 - y_i^2)ab - x_i y_i b^2]^2$$
$$= \sum_i [A_i(a^2 - b^2) - B_i ab]^2$$

$(A_i = x_i y_i, B_i = x_i^2 - y_i^2)$
$a^2 - b^2 = \cos^2\theta - \sin^2\theta = \cos 2\theta$
$ab = \cos\theta\sin\theta = \frac{1}{2}\sin 2\theta$ $$E = \sum_i \left[A_i \cos 2\theta - \frac{1}{2}B_i \sin 2\theta\right]^2$$

For the value of θ that minimizes the evaluation function E, the value of θ for which $dE/d\theta=0$ should be found.

Differentiating the equation (4) by θ, the following equation (5) is obtained.

$$\frac{dE}{d\theta} = \sum_i 2\left(A_i\cos 2\theta - \frac{1}{2}B_i\sin 2\theta\right)(-2A_i\sin\theta - B_i\cos 2\theta) = 0 \quad (5)$$

$$\sum_i [(-4A_i^2 + B_i^2)\sin 2\theta \cos 2\theta - 2A_i B_i(\cos^2 2\theta - \sin^2 2\theta)] = 0$$

$$\sum_i \left[(-4A_i^2 + B_i^2)\frac{1}{2}\sin 4\theta - 2A_i B_i \cos 4\theta\right] = 0$$

$C\sin 4\theta - D\cos 4\theta = 0$ $$\left(C = \sum_i (-4A_i^2 + B_i^2), D = \sum_i 4A_i B_i\right)$$

Hence, θ is found as shown by equation (6) below.

$$\theta = \frac{1}{4}\tan^{-1}\frac{D}{C} \quad (6)$$

Two values are found for θ. These are substituted into the equation (4), and the value of θ for which the evaluation function E is the smaller is adopted.

Next, inverse coordinate transformation is applied to the three dimensional data TD4 to convert it back to the original coordinate system. Then, the X and Y axes set in the above processing (a) are rotated through θ about the Z axis to determine the orientation (X and Y axes) of the plane surface (surface ME) to be generated.

[Embodiment 2 of Mode 1]

In the second embodiment, the X and Y axes are determined using a technique of principal component analysis.

First, the processing (a) and (b) in the first embodiment is carried out. Then, the processing (c) described below is carried out.

(c) Perform principal component analysis with the vectors vi=(xi, yi), and determine the direction of the first principal component vector as the X-axis direction. However, since coordinate transformation has been applied to the three dimensional data TD4 in the above processing (a), inverse coordinate transformation must be performed.

Though principal component analysis is a known technique, an outline will be described below.

[Principal Component Analysis]

Conditions for Principal Component Vectors and Procedures
1. The magnitude of each principal component vector is 1.

(Normality: $\|u_i\|^2=1, i=1, \ldots, m$)

Here, m represents the degree, which is 2 in the present embodiment since two axes, the X and Y axes, are involved.
2. The first principal component vector $u_1$ is determined so that the variance of its direction component $k_1$ becomes the largest.

$$\left(\text{Variance maximization } \langle k_i^2 \rangle = \frac{1}{n}\sum_{i=1}^{n} k_{1i}^2 \to \max\right)$$

3. The second principal component vector $u_2$ is determined so that the variance of its direction component $k_2$ becomes the largest under the condition that the condition 1 is satisfied and that it is uncorrelated with $k_2$.

$$\left(\text{Condition for uncorrelatedness } \langle k_i k_2 \rangle = \frac{1}{n}\sum_{i=1}^{n} k_{1i}k_{2i} = 0\right)$$

4. Likewise, the j-th principal component vector uj is determined so that the variance of its direction component kj becomes the largest under the condition that it is uncorrelated with kj.

Calculation of the First Principal Component Vector
Supposition and expression for samples
Number of samples: n i-th sample: $X_i = \begin{bmatrix} x_{i,1} \\ x_{i,2} \end{bmatrix}$ Average is zero vector
First principal component of i-th sample is $k_i = X_i^T u_i$ Variance of first principal component over entire sample is $$E = \frac{1}{n}\sum_{i=1}^{n}(X_i^T u_i)^2 \to \min$$

Condition for normality is $\|u_1\|^2 = 1$

Since this is a conditional minimization problem, Lagrange's method of undetermined coefficients is used. That is, introducing a parameter $\lambda$, $u_1$ and $\lambda$ that minimize equation (7) below are found.

$$E = \frac{1}{n}\sum_{i=1}^{n}(X_i^T u_i)^2 - \lambda(\|u_1\|^2 - 1) \quad (7)$$

For this purpose, the equation (7) is differentiated with respect to each element of $u_1$, and solved by equating it to zero.

To rearrange the expression, if we put $X = [X_1, \ldots, X_n]$ then $$X^T u_1 = \begin{bmatrix} X_1^T \\ \vdots \\ X_n^T \end{bmatrix} u_1 = \begin{bmatrix} X_1^T u_1 \\ \vdots \\ X_n^T u_1 \end{bmatrix}$$

Hence, $E_1$ is expressed as $$E_1 = \frac{1}{n}\sum_{i=1}^{n}(X_i^T u_1)^2$$

$$= \frac{1}{n}[X_1^T u_1 \cdots X_n^T u_1]\begin{bmatrix} X_1^T u_1 \\ \vdots \\ X_n^T u_1 \end{bmatrix}$$

$$= \frac{1}{n}(X^T u_1)^T X^T u_1$$

$$= \frac{1}{n}u_1^T X X^T u_1$$

$$= u_1^T C u_1$$

Using this expression, the objective function is expressed as $E = u_1^T C u_1 - \lambda(\|u_1\|^2 - 1)$ Differentiating the equation with respect to $u_1$ and equating it to zero, we have $$\frac{\partial E}{\partial u_1} = 2Cu_1 - 2\lambda u_1 = 0$$

$$\therefore (C - \lambda 1)u_1 = 0$$

The above equation is equivalent to an eigenvalue problem. For the above equation to have a significant solution ($u_1 \neq 0$), the matrix=0, that is, $|C - \lambda I| = 0$ must be satisfied. This matrix equation can be expanded to a polynomial in $\lambda$, $a_0 + a_1\lambda + a_2\lambda^2 + \ldots + a_m\lambda^m = 0$ There are a number, m, of $\lambda$ values that satisfy this equation and, from the positive semidefinite nature of a covariance matrix, it is known that the values are all nonnegative.

Of the solutions of the equation in $\lambda$, the largest one is found, and the eigenvector corresponding to it is the first principal component. The eigenvalue at this time provides the variance of the first principal component. Consider an eigenvector corresponding to the i-th solution $\lambda i$. The variance $Ei$ of this eigenvector's direction is shown as follows.

$E_i = u_i^T C u_i = u_i^T \lambda_i u_i = \lambda_i \|u_i\|^2 = \lambda_i$

That is, the eigenvalue itself provides the variance of the eigenvector.

Therefore, of the eigenvalues, the largest one should be selected, and its corresponding eigenvector should be taken as the first principal component vector. Then, the eigenvector corresponding to the second largest one should be taken as the second principal component vector.

[Embodiment 3 of Mode 1]

The first and second embodiments described above have dealt with examples in which a plane surface is fitted onto a dropout portion; by contrast, the third embodiment described hereinafter deals with an example in which a plane surface is fitted onto a portion for which it is desired to form a new surface, regardless of the presence or absence of a dropout portion.

That is, in the third embodiment, a plane surface is generated for three dimensional data TD so as to match the orientation of the polygons in the three dimensional data TD. When fitting the grid-patterned plane surface onto the three dimensional data TD, the orientation of the plane surface is set so that the grid orientation of the plane surface (the orientation of the XY coordinate axes of the plane surface) matches the orientation of the polygons in the selected region.

The following processing (a) to (c) is performed.

(a) Select polygons in the region where it is desired to generate a plane surface in the three dimensional data TD. The user can select the polygons.

(b) Calculate the average value of the normal vectors of the selected polygons.

The average value is set as the Z-axis direction in the coordinate system of the plane surface to be generated. The X and Y axes are set in suitable directions. For example, the line of intersection between the plane to be fitted and the XY plane of the original coordinate system is set as the X axis. Then, the three dimensional data TD is converted to the newly set XYZ coordinate system. The following description considers the XY plane in this newly set coordinate system.

(c) Examine vertices defining the boundaries between the selected polygons and non-selected polygons. Pick up vectors vi=(xi, yi), each having a starting point at a vertex of a selected polygon and an end point at a vertex of the non-selected polygon connected to it, are picked up. At this time, each vector vi is normalized to magnitude 1. Using the vectors vi, the X and Y axes of the plane surface to be generated are determined.

The method of determining the axes is the same as that shown in the processing (c) and (d) in the first embodiment of the first mode and the processing (c) in the second embodiment of the first mode.

[Details of Mode 2]

In the second mode, a surface is generated for a dropout portion KR so as to match the shape of three dimensional data TD. When fitting the grid-patterned plane surface onto the dropout portion KR of the three dimensional data TD, by considering the shape around the dropout portion KR the plane surface (the coordinate axes of the plane surface) is oriented along a direction that follows the shape

[Embodiment 1 of Mode 2]

Figure 10:
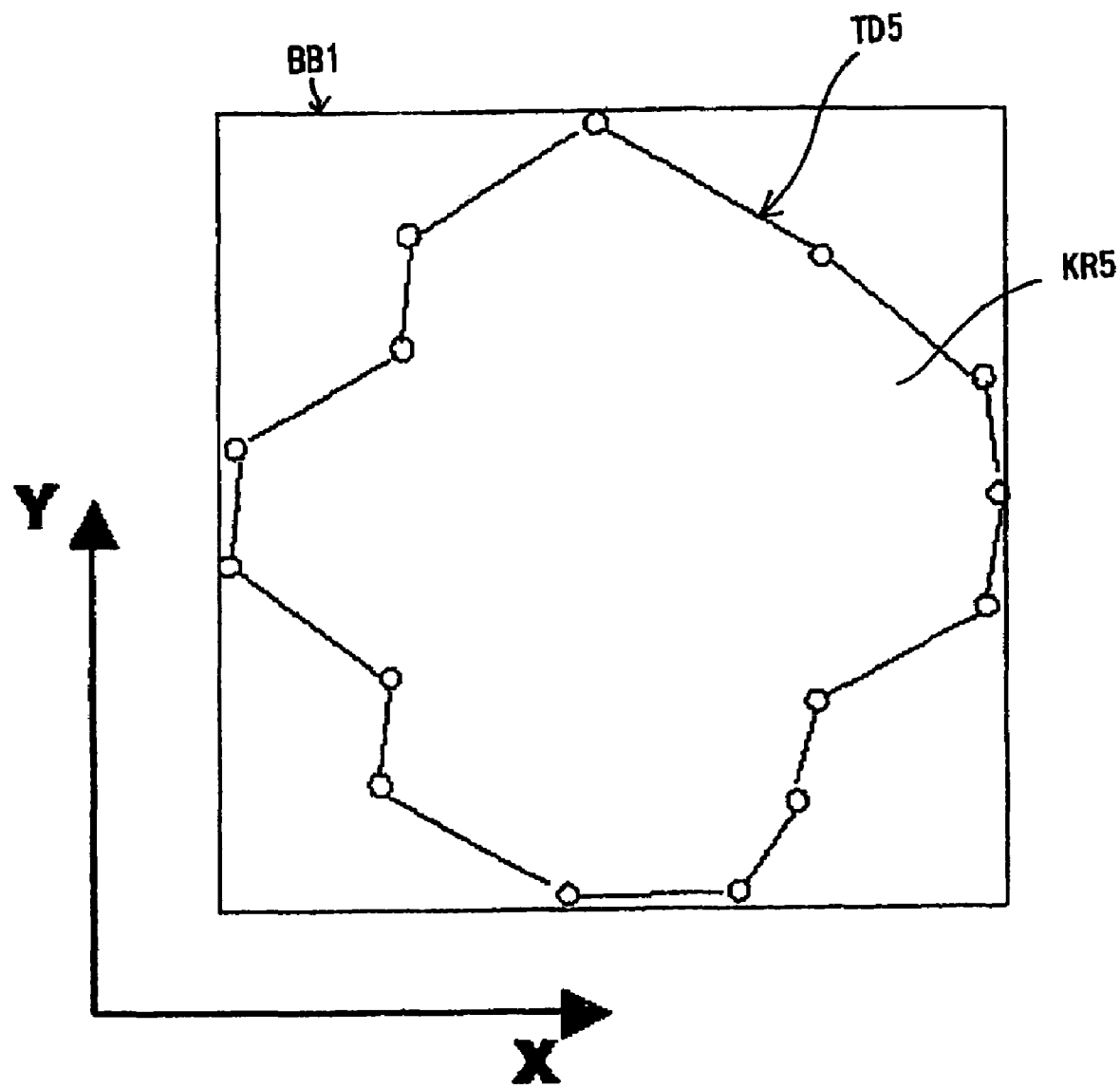
FIG. 10 is a diagram showing the arrangement of a bounding box in a first embodiment of the second mode.
Figure 11:
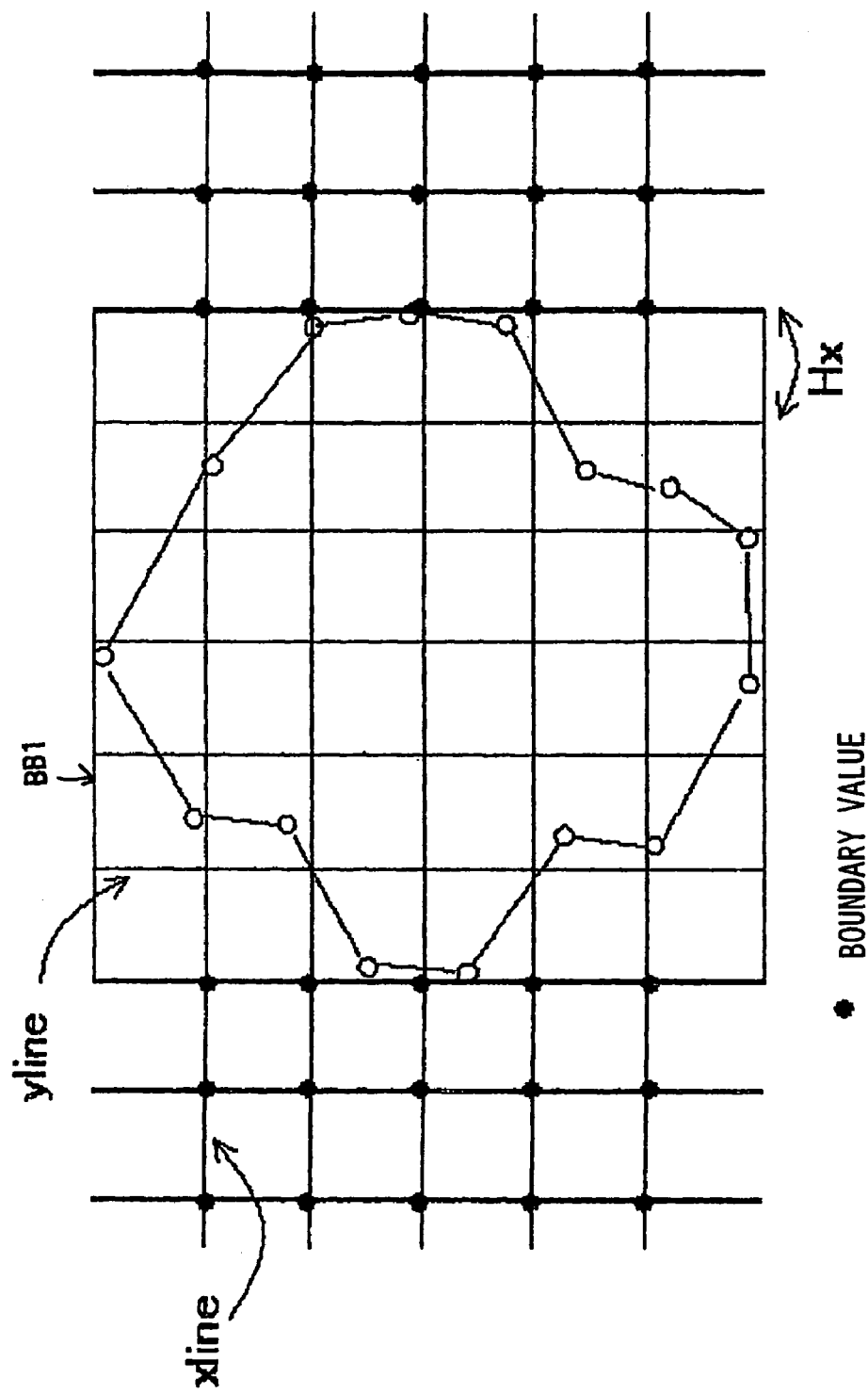
FIG. 11 is a diagram showing X lines and Y lines set in the bounding box.

FIG. 10 is a diagram showing the arrangement of a bounding box BB1 in the first embodiment of the second mode, and FIG. 11 is a diagram showing X lines and Y lines set in the bounding box BB1.

The following processing (a) to (f) is carried out for the dropout portion KR5 of the three dimensional data TD5.

(a) Regard the dropout portion KR5 of the three dimensional data TD5 as a polygon, and find a normal to it. Set the direction of the normal as the Z-axis direction of the plane surface (surface ME) to be generated. Set the X and Y axes in suitable directions. Then, convert the three dimensional data TD5 to the newly set XYZ coordinate system. The following description considers the XY plane in this newly set coordinate system.

(b) Take the thus set X axis as the horizontal direction, and the Y axis as the vertical direction. Generate the bounding box BB1 for the dropout portion KR5. Since the grid-patterned plane surface is supposed to be generated within the bounding box BB1, the purpose here is to correctly set the X axis and Y axis of the bounding box BB1.

(c) Set a grid inside and outside the bounding box BB1, as shown in FIG. 11. The grid consists of X lines horizontally and Y lines vertically. The grid line spacing is determined in advance. The X lines are extended in the horizontal direction (X-axis direction) of the bounding box BB1, and the Y lines are drawn at intervals of Hx.

The Z values of the points where the X lines intersect the boundary of the bounding box BB1 and the Z values of the points where the X lines intersect the Y lines in regions outside the bounding box BB1 provide boundary values. The boundary values are indicated by filled circles in FIG. 11. These boundary values can be obtained by projecting the grid points onto the polygons in the three dimensional data TD5.

(d) Calculate the evaluation value E from the boundary values. The method of calculating the evaluation value E will be described later.

(e) Apply inverse coordinate transformation to convert the three dimensional data TD5 back to the original coordinate system by rotating it through a predetermined angle θ about the Z axis, and return to the above processing (b). Then, the processing from (b) to (e) is repeated until a 90-degree rotation is achieved.

(f) Find the value of angle θ that minimizes (or maximizes) the obtained evaluation value E, and set it as the optimum angle. Rotate the X and Y axes, set in the processing (a), through the thus obtained optimum angle θ about the Z axis, and generate a plane surface whose sides are located along the thus rotated X and Y axes.

That is, by rotating through the angle θ that minimizes (or maximizes) the evaluation value E, the plane surface is oriented along the circumferential surface of the three dimensional data TD5. For example, in the case of the three dimensional data TD2 shown in FIG. 4, the surface ME2 is oriented in the direction such that the spacing between the surface ME2 and the circumferential surface of the circular cylinder is maintained constant. The plane surface thus arranged can be deformed in such a manner as to follow the curvature of the three dimensional data TD by using a suitable method.

Next, the method of calculating the evaluation value E will be described.

[Evaluation Value Calculation Method 1]

In this method, the evaluation value E is obtained from a gradient difference.

Figure 12:
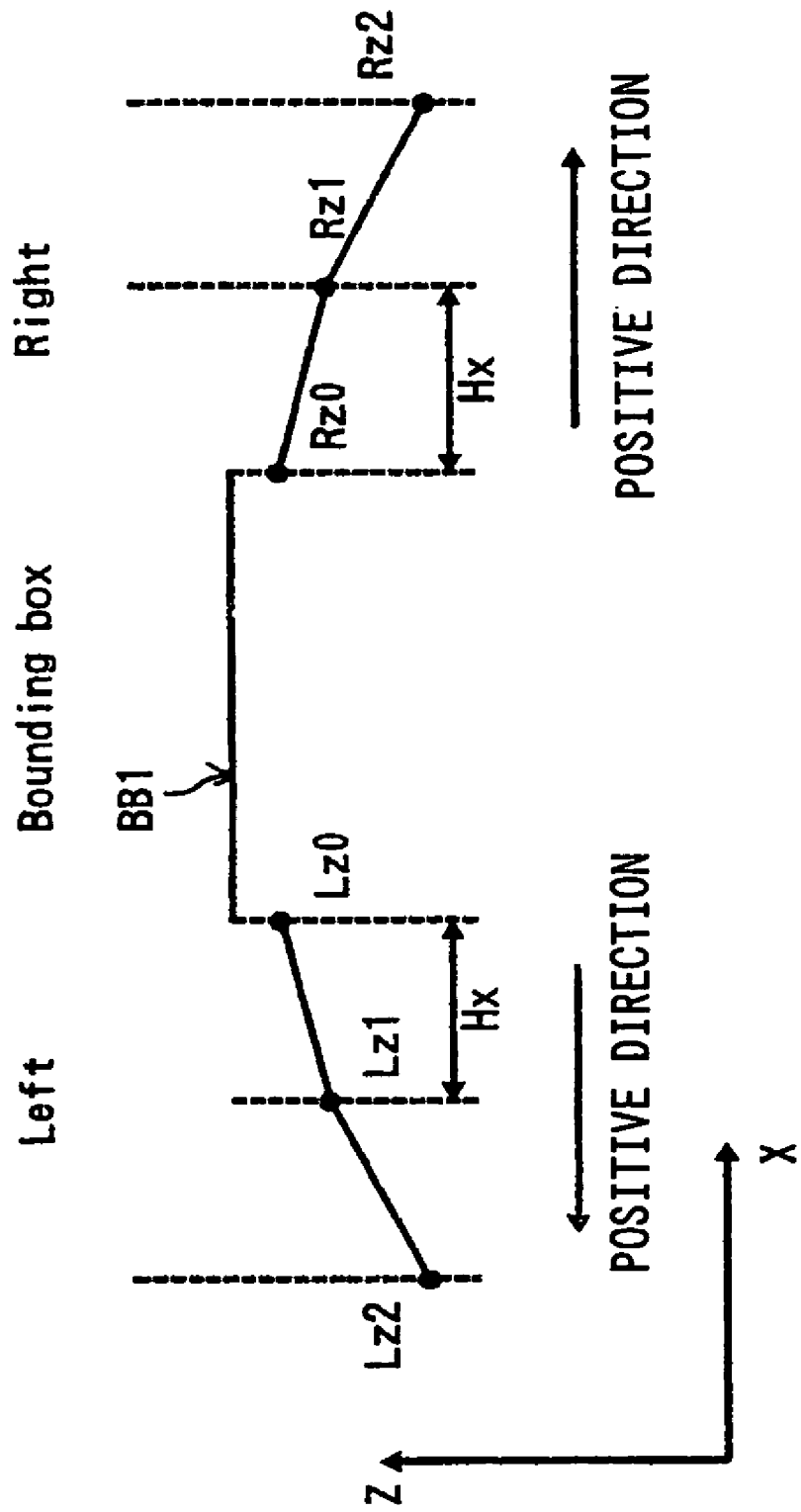
FIG. 12 is a diagram for explaining a method of obtaining an evaluation value from a gradient difference.

FIG. 12 is a diagram for explaining the method of obtaining the evaluation value E from a gradient difference.

Attention is paid to each X line (see FIG. 11). As shown in FIG. 12, gradients are obtained from the boundary values Lz0, Lz1, and Lz2 on the left side of the bounding box BB1 and the boundary values Rz0, Rz1, and Rz2 on the right side, and the average gradients gradL and gradR are respectively obtained. The evaluation value E is calculated based on the average gradients.

Attention is paid to the bounding values on the i-th X line. Using the following equation, average gradients gradLi and gradRi are respectively obtained from pairs of successive boundary values on the left and right sides of the bounding box BB1. On the left side, the leftward direction is taken as the positive direction, and on the right side, the rightward direction is taken as the positive direction. That is, the direction directed away from the bounding box BB1 is taken as the positive direction. In the equation, m indicates the number of boundary values.

$$gradL_i = \frac{\sum_{j=0}^{m-1}(Lz_{j+1} - Lz_j)/H_x}{m-1}$$

$$gradR_i = \frac{\sum_{j=0}^{m-1}(Rz_{j+1} - Rz_j)/H_x}{m-1}$$

Then, the square of the difference between gradLi and gradRi is calculated.

$Ei=(gradLi-gradRi)^2$

When there are n X lines, the evaluation value E is calculated as follows.

$$E = \frac{\sum_n E_i}{n}$$

That is, the average of the squares of the differences between left and right calculated on an X-line by X-line basis is taken as the evaluation value E. When the plane surface (surface ME) is inclined on the left and right sides by approximately the same amount, the evaluation value E becomes small. Accordingly, the plane should be rotated by the angle θ that minimizes the evaluation value E.

[Evaluation Value Calculation Method 2]

This method also obtains the evaluation value E from a gradient difference.

The method of calculation is similar to the method 1 described above, except that the positive direction along the x axis is set the same between the left and right sides. That is, in FIG. 12, the rightward direction, which is taken as the positive direction on the right side, for example, is also taken as the positive direction of the gradient of the boundary values on the left side. In this case, the plane surface is arranged along the non-curving direction of the circumferential surface (along the axial direction of the circular cylinder).

[Evaluation Value Calculation Method 3]

In this method, the magnitudes of gradients are calculated.

Gradient is calculated from each pair of successive boundary values on each X line. The gradient is calculated for every pair on every line, and the average of the magnitudes (absolute values) of the gradients is taken as the evaluation value E. The average is determined so as to minimize the evaluation value E. The gradient is smaller as the evaluation value E decreases. The evaluation value E is given by the following equation.

$$E = \frac{\sum |grad|}{numgrad}$$

Here, grad denotes the gradient. Further, numgrad indicates the number of obtained gradients, which is equal to n shown by the following equation.

n=(number of X lines)×(number of boundary values on one line−1)×2

[Evaluation Value Calculation Method 4]

In this method, the variances of boundary values are calculated.

Figure 13:
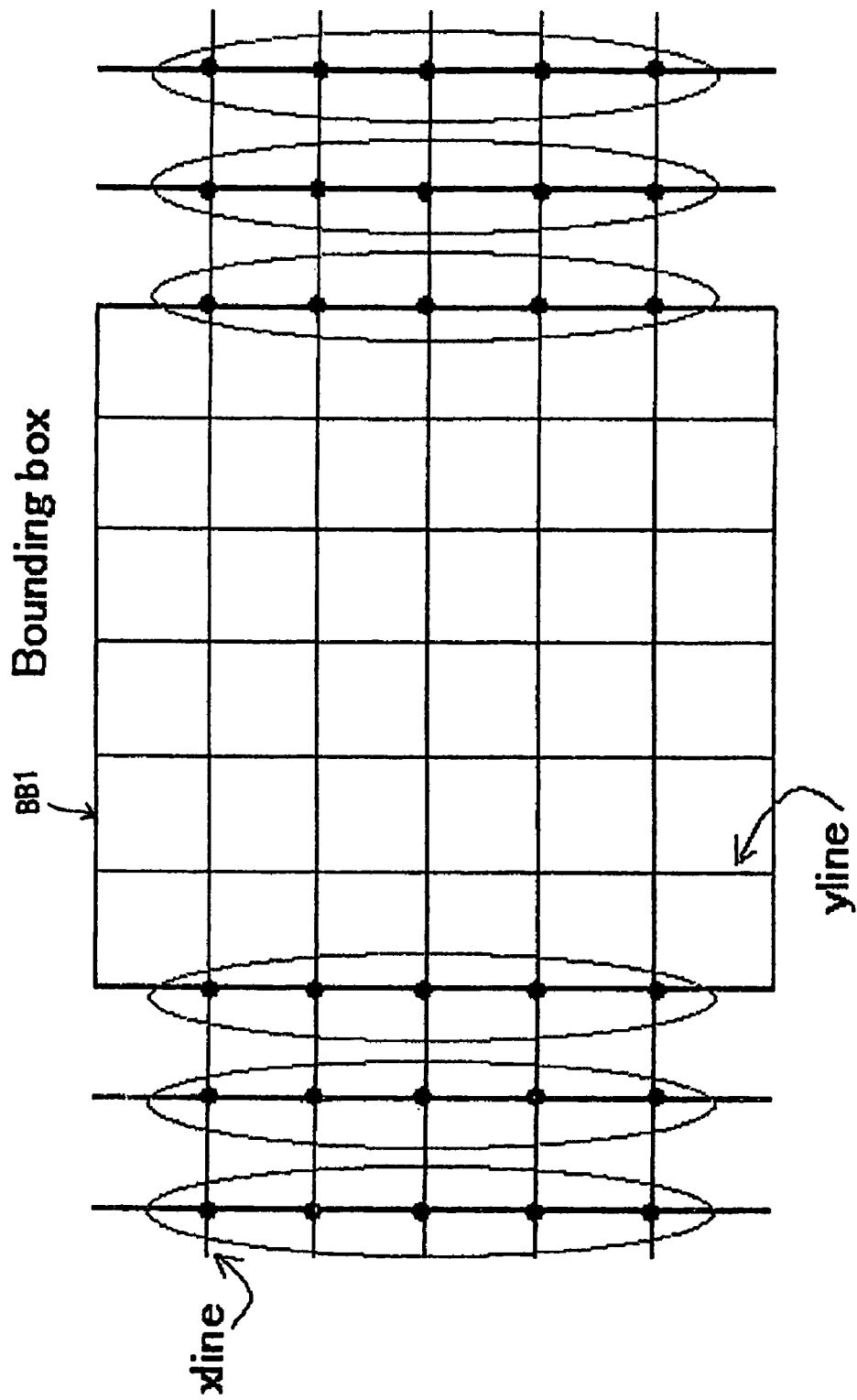
FIG. 13 is a diagram for explaining a method of obtaining the evaluation value from the variances of boundary values.

FIG. 13 is a diagram for explaining the method of obtaining the evaluation value E from the variances of boundary values.

As shown circled by ellipses in FIG. 13, attention is paid to the boundary values on the lines parallel to the Y lines. In other words, attention is paid to each group of boundary values whose x coordinates are the same. The variance of the z value at the boundary values is calculated. Variances are calculated for the respective groups, and the average is taken as the evaluation value E.

In this method also, the average is determined so as to minimize the evaluation value E. Variation among the boundary values on each Y line becomes smaller as the evaluation value E decreases.

[Evaluation Value Calculation Method 5]

In this method, the variances of boundary values are calculated.

Figure 14:
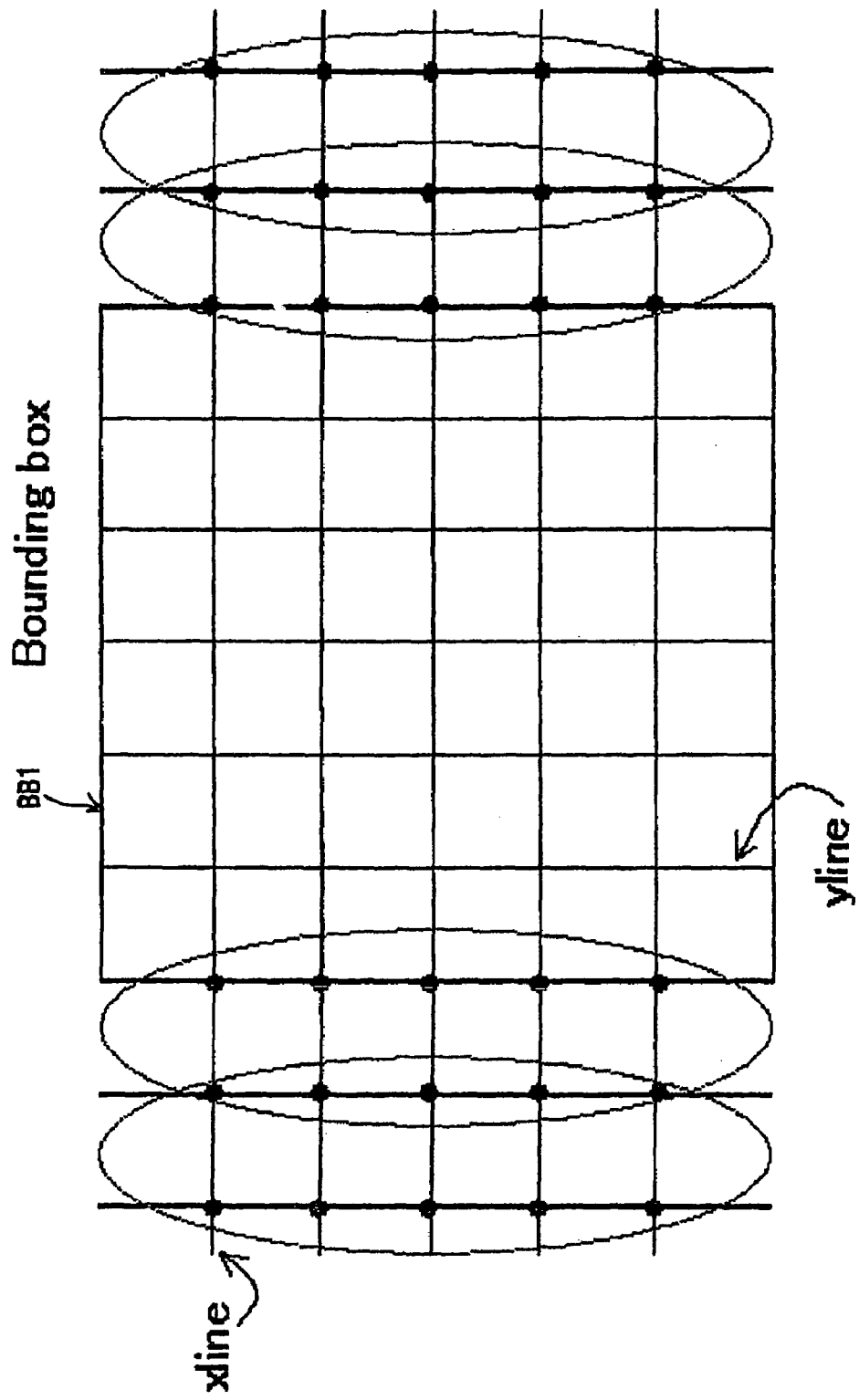
FIG. 14 is a diagram for explaining a method of obtaining the evaluation value from the variances of boundary values.

FIG. 14 is a diagram for explaining the method of obtaining the evaluation value E from the variances of boundary values.

As shown circled by ellipses in FIG. 14, attention is paid to the boundary values on each pair of adjacent lines parallel to the Y lines. Gradient is calculated from two adjacent boundary values lying on the same X line, and the variance is calculated from all the gradients. The variances of the gradients are calculated for the respective groups, and the average is taken as the evaluation value E.

In this method also, the average is determined so as to minimize the evaluation value E. Variation along the X direction on each Y line becomes smaller as the evaluation value E decreases.

[Embodiment 2 of Mode 2]

Figure 15:
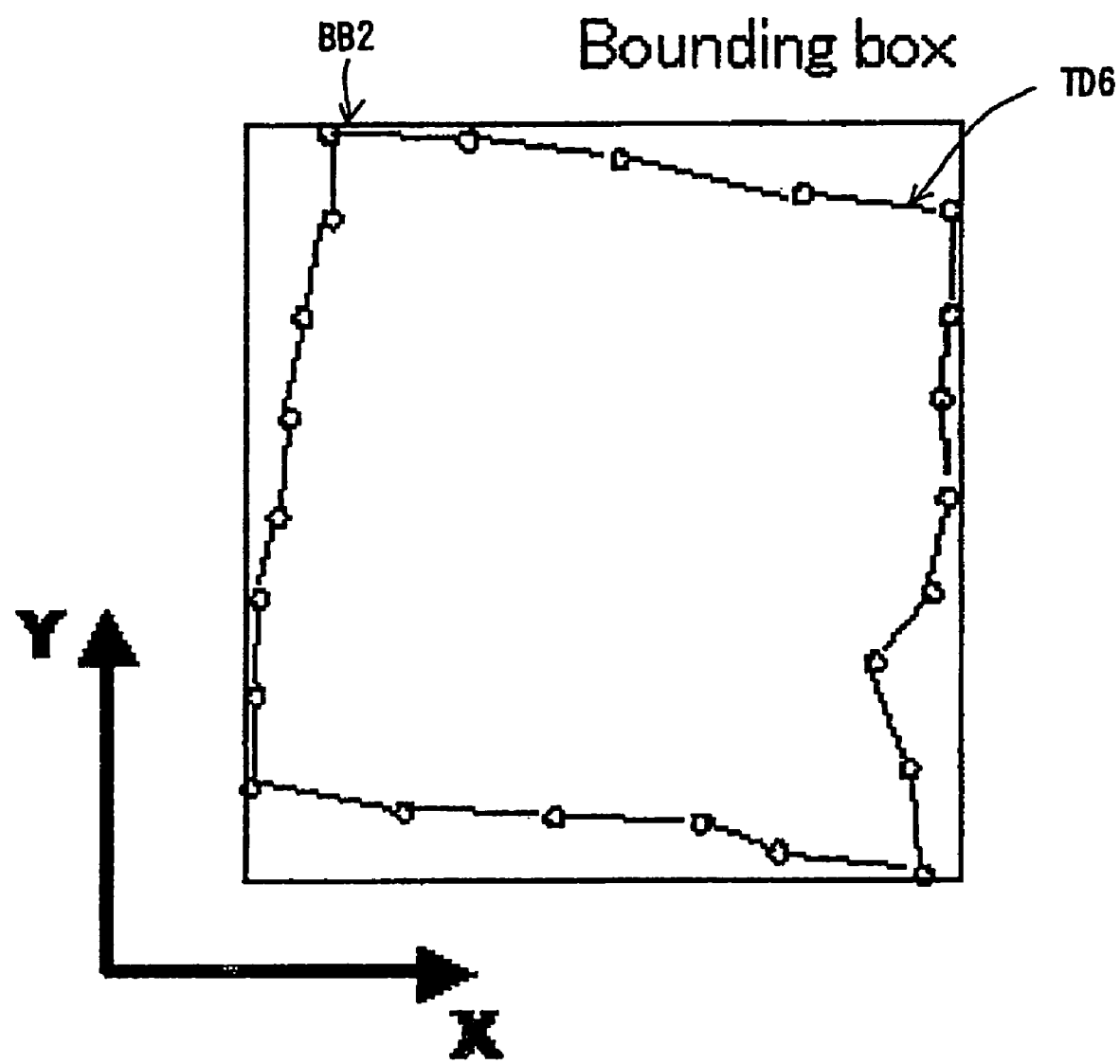
FIG. 15 is a diagram showing the arrangement of a bounding box in a second embodiment of the second mode.

FIG. 15 is a diagram showing the arrangement of a bounding box BB2 in the second embodiment of the second mode.

The second embodiment deals with an example in which a plane surface is fitted onto a portion for which it is desired to form a new surface, regardless of the presence or absence of a dropout portion.

That is, in the second embodiment, when forming the grid-patterned plane surface for three dimensional data TD6, by considering the shape of the three dimensional data TD6 the plane surface (the coordinate axes of the plane surface) is oriented along a direction that follows the shape.

The following processing (a) to (c) is performed.

(a) Select polygons in the region where it is desired to generate a plane surface in the three dimensional data TD6.

(b) Calculate the average value of the normal vectors of the selected polygons.

The average value is set as the Z-axis direction in the coordinate system of the plane surface to be generated. The X and Y axes are set in suitable directions. For example, the line of intersection between the plane to be fitted and the XY plane of the original coordinate system is set as the X axis. Then, the three dimensional data TD6 is converted to the newly set XYZ coordinate system. The following description considers the XY plane in this newly set coordinate system.

(c) Take the thus set X axis as the horizontal direction, and the Y axis as the vertical direction. Generate the bounding box BB2 for the selected polygons. The purpose here is to obtain the X and Y axes of the bounding box BB2.

The method of determining the axes is the same as that shown in the processing (c) to (f) in the first embodiment of the second mode.

[Details of Mode 3]

In the third mode, as earlier described, the density of grid points on the surface to be generated, that is, the number of grid points and grid point spacing, for example, is determined automatically. It is assumed that the orientation (X-axis direction and Y-axis direction) of the plane surface to be generated is already determined in accordance with the method described, for example, in the first mode or the second mode.

[Embodiment 1 of Mode 3]

Figure 16:
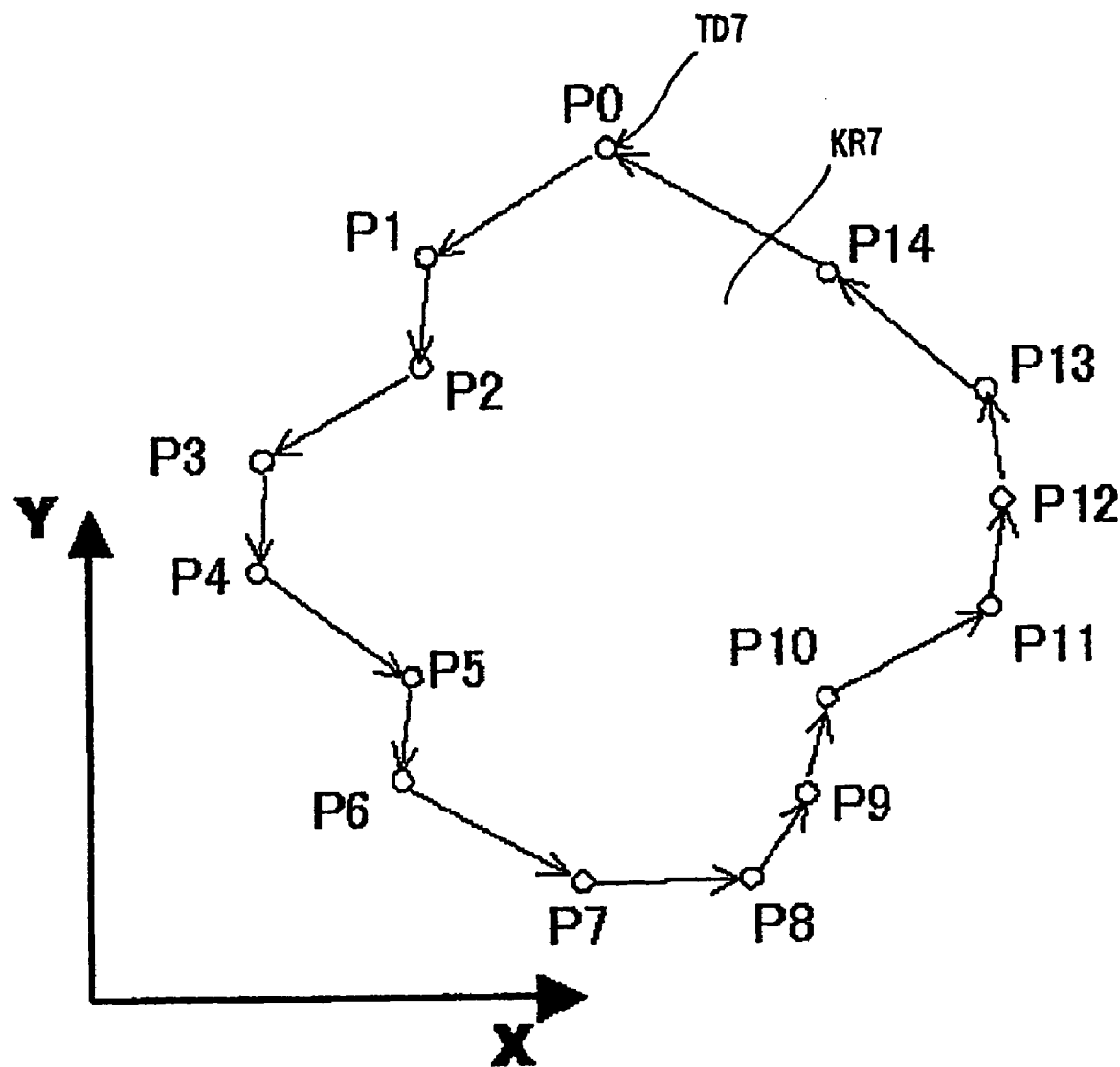
FIG. 16 is a diagram showing the arrangement of vertices in three dimensional data in accordance with a first embodiment of the third mode.

FIG. 16 is a diagram showing the arrangement of vertices in three dimensional data TD7 in accordance with the first embodiment of the third mode.

The following processing (a) to (d) is carried out for a dropout portion KR7 of the three dimensional data TD7.

(a) Regard the dropout portion KR7 of the three dimensional data TD7 as a polygon and, for vertices P0, P1, P2, . . . forming the polygon, consider vectors each consisting of two adjacent vertices.

(b) Classify each vector by examining whether the direction of the vector is close to the x-axis direction or y-axis direction in the coordinate system determined for surface generation.

More specifically, the vector is normalized, and the absolute value of the x component is compared with the absolute value of the y component; if the x component is greater in magnitude, the vector is classified as a vector close to the x-axis direction, and if they component is greater in magnitude, the vector is classified as a vector close to the y-axis direction. This classification is performed on every vector.

(c) For the vectors classified as vectors close to the x-axis direction, the average value of the x components is taken. Likewise, for the vectors classified as vectors close to the y-axis direction, the average value of they components is taken. These two average values are taken as spacings in the X direction and Y direction in an ideal grid, and denoted by x space and y space, respectively.

(d) When the vertical and horizontal lengths of the bounding box BB for the dropout portion KR7 are denoted by H and W, respectively, the number of grid points, num x and num y, to be generated is given as num x=W/x space num y=H/y space If num x or num y is not exactly divisible, the number is rounded to the nearest integer.

If num x or num y becomes 1, a grid-patterned surface cannot be generated; in that case, num x or num y is set to 2.

[Embodiment 2 of Mode 3]

Figure 17:
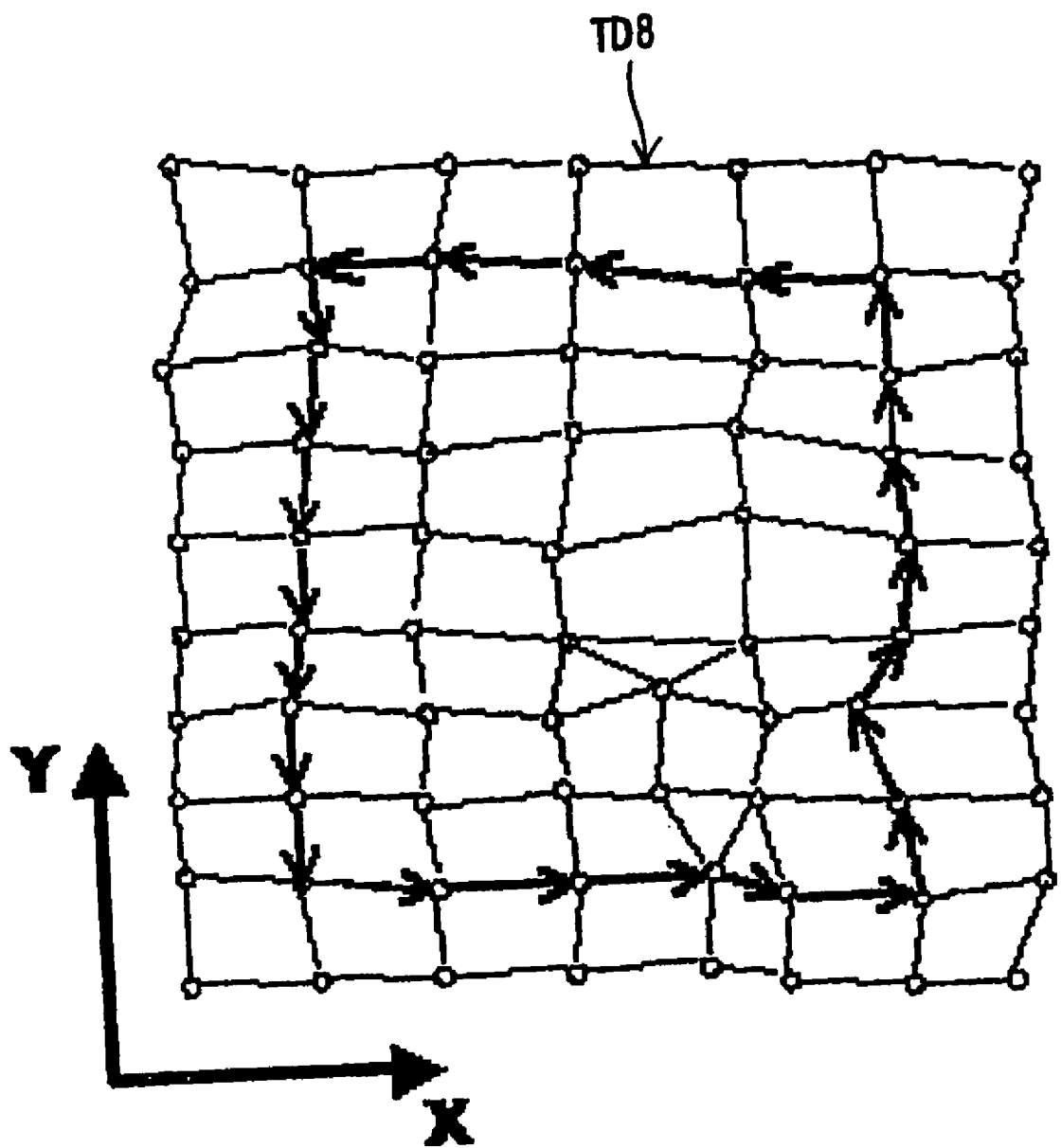
FIG. 17 is a diagram showing the arrangement of three dimensional data in a second embodiment of the third mode.

FIG. 17 is a diagram showing the arrangement of three dimensional data TD8 in the second embodiment of the third mode.

The second embodiment deals with an example in which a plane surface is fitted onto a portion for which it is desired to form a new surface, regardless of the presence or absence of a dropout portion.

(a) In the three dimensional data TD8, select polygons in the region where it is desired to generate a plane surface.

(b) For vertices on the boundaries between the selected polygons and non-selected polygons, consider vectors each consisting of two adjacent vertices.

Using the vectors, the number of grid points is determined. The method of determining the number is the same as that described in (b) to (d) in the first embodiment of the third mode.

As described above, according to the three dimensional processing apparatus 1 of the present invention, when filling a dropout portion of three dimensional data or forming a desired surface, for example, the orientation of a newly generated surface, etc. are automatically determined, thereby achieving generation of more natural three dimensional data.

In the above-described modes, the configuration of the whole or part of the three dimensional processing apparatus 1, the details of processing, the order of processing, the shape of three dimensional data TD, etc. can be altered in accordance with the purpose of the invention.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method for fitting a grid-patterned surface data onto a portion of a three-dimensional shape data including a plurality of polygons, the method comprising:
   a first step of detecting a condition of a plurality of polygons in the three dimensional shape data that are located at a periphery of a surface to be fitted the surface data;
   a second step of determining a condition of a grid-pattern of the surface data on the basis of the detected condition of the plurality of polygons; and
   a third step of fining the surface data whose grid-pattern has been determined onto the three dimensional shape data, wherein
   fitting the surface data whose grid-pattern has been determined onto the three-dimensional shape data includes adding new surface to the three-dimensional shape data.

2. The method according to claim 1,
   wherein said condition of the plurality of polygons includes an orientation thereof, and said condition of the grid-pattern includes an orientation thereof for the three-dimensional shape data.

3. The method according to claim 2,
   wherein the orientation of the plurality of polygons is detected in the first step by picking up a vector whose starting point is at a vertex of the polygon located at the periphery of the surface to be fitted, and whose end point is at a vertex connected to the vertex taken as the starting point, and the orientation of the grid-pattern is determined in the second step so as to take along direction of the picked up vector.

4. The method according to claim 1,
   wherein said condition of the plurality of polygons includes a position thereof in a three-dimensional space, and said condition of the grid-pattern includes an orientation thereof for the three-dimensional shape data.

5. The method according to claim 4,
   wherein said second step comprising sub-steps of:
   generating a rectangular bounding box that includes the portion to be fitted the surface data;
   setting a grid inside and outside the bounding box;
   obtaining a Z value of a vertex of the grid as a boundary value;
   rotating the bounding box so that an evaluation value based of the boundary value is minimized or maximized; and
   determining the orientation of the surface so that the orientation of the grid-pattern aligns with a coordinate space whose X or Y axis is taken along a direction in which the grid of the bounding box is oriented by the rotation.

6. The method according to claim 1,
   wherein said condition of the plurality of polygons includes a density thereof, and said condition of the grid-pattern includes a density thereof.

7. The method according to claim 6,
   wherein the density of the plurality of polygons is detected in the first step by picking up vectors each consisting of two adjacent vertices in the vertices forming each polygon, and in the second step, the density in X direction is detected on the basis of an average value of the x components of the vectors near the X-axis direction among the picked up vectors, the density in Y direction is detected on the basis of an average value of the Y components of the vectors near the Y-axis direction among the picked up vectors, and the density of the grid is determined on the basis of the detected densities.

8. The method according to claim 1,
   wherein said portion of the three-dimensional shape data is where three-dimensional shape data is absent.

9. The method according to claim 1,
   wherein said portion of the three-dimensional shape data is designated from within the three-dimensional shape data by an operator.

10. A method for fitting a grid-patterned surface data onto a portion of a three-dimensional shape data consisting of a plurality of polygons, the method comprising:
    a first step of picking up a vector whose starting point is at a vertex of a polygon located at a periphery of the surface to be fitted the surface data;
    a second step of determining an orientation of the surface data on the basis of the picked up vector; and a third step of fitting the surface data to the three-dimensional shape data in the determined orientation, wherein fitting the surface data to the three-dimensional shape data in the determined orientation includes adding new surface to the three-dimensional shape data.

11. The method according to claim 10, wherein in the second step, X-Y coordinates are determined so as to minimize a sum of the squares of the products of the x and y components of the respective vectors, and the orientation of the surface data is determined according to the determined X-Y coordinates.

12. The method according to claim 10, wherein in the second step, X-Y coordinates are determined using a technique of principal component analysis, and the orientation of the surface data is determined according to the determined X-Y coordinates.

13. A method for fitting a grid-patterned surface data onto a portion of a three-dimensional shape data consisting of a plurality of polygons, the method comprising steps of:

generating a rectangular bounding box that includes the portion to be fitted the surface data;

setting a grid inside and outside the bounding box;

obtaining an evaluation value based on Z value of a vertex of the grid;

determining the orientation of the surface according to orientation of the bounding box which makes the evaluation value a minimum or a maximum; and fitting the grid-patterned surface data onto the three-dimensional shape data in the determined orientation, wherein fitting the surface data onto the three-dimensional shape data in the determined orientation includes adding new surface to the three-dimensional shape data.

14. A method for fitting a grid-patterned surface data onto a portion of a three-dimensional shape data consisting of a plurality of polygons, the method comprising steps of:

picking up vectors each consisting of two adjacent vertices in the vertices forming the portion;

determining a density of grid points in X direction on the basis of an average value of the x components of the vectors near the X-axis direction among the picked up vectors;

determining the density of grid points in Y direction on the basis of an average value of the Y components of the vectors near the Y-axis direction among the picked up vectors; and fitting the surfaces, the density of which grid is determined, to the three-dimensional shape data, wherein fitting the surface to the three-dimensional shape data includes adding new surface to the three-dimensional shape data.

15. An apparatus for fitting a grid-patterned surface data onto a portion of a three-dimensional shape data consisting of a plurality of polygons, the apparatus comprising:

a detector for detecting a condition of a plurality of polygons in the three-dimensional shape data that are located at a periphery of a surface to be fitted the surface data;

a determination portion for determining a condition of a grid-pattern of the surface data on the basis of the detected condition of the plurality of polygons; and a processor for fitting the surface data whose grid-pattern has been determined onto the three-dimensional shape data, wherein fitting the surface data whose grid-pattern has been determined onto the three-dimensional shape data includes adding new surface to the three-dimensional shape data.

16. A computer program product comprising a computer usable medium, having encoded thereon a computer readable program for fitting a grid-pattern surface onto a portion of a three-dimensional shape data including a plurality of polygons, by performing the operations of:

detecting a condition of a plurality of polygons in the three-dimensional shape data that are located at a periphery of a surface to be fitted the surface data;

determining a condition of a grid-pattern of the surface data on the basis of the detected condition of the plurality of polygons; and fitting the surface data whose grid-pattern has been determined onto the three-dimensional shape data, wherein fitting the surface data whose grid-pattern has been determined onto the three-dimensional shape data includes adding new surface to the three-dimensional shape data.

* * * * *